United States Patent [19]

Syred et al.

[11] Patent Number: 4,634,456

[45] Date of Patent: Jan. 6, 1987

[54] CLASSIFICATION AND/OR GRADING

[75] Inventors: Nicholas Syred, Cardiff; Martin Biffin, Pontyclun, both of Wales

[73] Assignee: Coal Industry (Patents) Limited, England

[21] Appl. No.: 684,288

[22] Filed: Dec. 20, 1984

[30] Foreign Application Priority Data

Jan. 24, 1984 [GB] United Kingdom ................. 8401845

[51] Int. Cl.[4] ............................................. B01D 53/24

[52] U.S. Cl. ........................................ 55/52; 55/345; 55/398; 55/452; 55/459 R; 209/144

[58] Field of Search ................. 55/345, 349, 392, 398, 55/452, 459 R, 459 A, 459 B, 461, 393, 52; 210/512.2; 209/144

[56] References Cited

U.S. PATENT DOCUMENTS

| | | | |
|---|---|---|---|
| 763,199 | 6/1904 | Newton et al. | 55/398 |
| 911,802 | 2/1909 | Baldwin | 55/398 X |
| 1,383,984 | 7/1921 | Clark | 55/393 X |
| 1,513,528 | 10/1924 | Bamber | 55/398 |
| 2,290,664 | 7/1942 | Allardice | 55/398 |

FOREIGN PATENT DOCUMENTS

| | | |
|---|---|---|
| 390053 | 3/1933 | United Kingdom . |
| 512886 | 9/1939 | United Kingdom . |
| 613363 | 11/1948 | United Kingdom . |
| 2108013 | 5/1983 | United Kingdom . |
| 2108409 | 5/1983 | United Kingdom . |
| 2113575 | 8/1983 | United Kingdom . |

*Primary Examiner*—Charles Hart

*Attorney, Agent, or Firm*—Stevens, Davis, Miller & Mosher

[57] ABSTRACT

Classifying and/or grading equipment includes a main vortex chamber and a secondary vortex chamber intersecting and opening into the main chamber. A gas/solids, liquid/solids or liquid/liquid combination is fed into the main vortex chamber and a component thereof is sheared off into the chamber for precipitation therein yielding a cut of the desired size or density.

18 Claims, 8 Drawing Figures

CLASSIFICATION AND/OR GRADING

This invention concerns improvements in or relating to classification and/or grading.

The present invention has reference to the classification and/or grading of gas/solids, liquid/solids or liquid combinations. In particular, although not exclusively, the invention is concerned with the classification and/or grading of gas borne particles of solids material.

The classification and grading of particulates can be important especially in the fields of pulverised coal grinding or minerals processing generally. Such classification and grading is conventionally effected by the use of swirling or vortical flow assisted in some instances by the employment of rotating elements such as blades of impellors.

Theoretically, it is desirable to force this swirling or vortical flow into a narrow annulus and to ensure that the flow is ani-symmetric. The flow should also follow a forced vortex type of tangential velocity profile, i.e. the tangential velocity decreases in proportion to radius, and should have a low turbulence level. From a practical viewpoint, the equipment used should possess the capability to allow variations in 'cut' size, ideally by a factor of 3 to 4, for example from 20 to 80 microns. The cut size should also be as sharp as possible. In addition, the particulate to gas loading must be as high as possible to keep the equipment as small as possible and hence as cheap as possible, and the fan pressure requirements should be as low as possible.

An object of the present invention is to provide an improved means for the classification and/or grading of gas/solids, liquid/solids or liquid/liquid combinations, whereby in the case of combinations including solids, the solids are classified or graded according to size and in the case of liquid/liquid combinations, the liquids are classified according to density.

According to a first aspect of the invention, equipment for the classification and/or grading of gas/solids, liquid/solids or liquid/liquid combinations, comprises a main vortex chamber having an inlet for the combination and a discharge outlet, and a secondary vortex chamber intersecting and opening into the main vortex chamber whereby in use a secondary vortex is generated in the secondary vortex chamber and driven by a main vortex in the main vortex chamber, a component of the combination being captured by the secondary vortex and being deposited in the secondary vortex chamber, and the combination thereby being classified or graded.

Conveniently the secondary vortex chamber is closed and thus no net flow occurs across the boundary between the main and secondary chambers.

Means are provided for removing the component deposited in the secondary chamber.

The inlet to the main vortex chamber may be tangential or may be of scroll form.

Advantageously an annular passage may be formed within the main vortex chamber whereby in use the inflowing combination follows a vortical path within the passage. The annular passage may be formed by means of a cylindrical or tapering body extending into the chamber. The body may be movable lengthwise of the chamber to provide adjustment to vary the classification or grading of the combination.

The secondary vortex chamber conveniently interacts and opens into the annular passage in the main chamber and may also be provided with a cylindrical or tapering body adjacent the boundary between the two chambers. The cylindrical body in the secondary vortex chamber may be movable lengthwise thereof to assume a position complementary to that of the body in the main chamber.

In an alternative, the secondary vortex chamber may be provided with an extension protruding into the main vortex chamber, the extension being movable to assume different positions for the purpose of varying the classification or grading cut required.

In a further alternative, a rotatable member may be mounted within the secondary vortex chamber. The member may have blading and, in use, may be rotated at varying speeds in order to alter the classification or grading cut as required and/or may be be rotated in the same or opposite direction to that of the secondary vortex.

In a still further alternative, a cylindrical or tapering body may be disposed within the secondary vortex chamber such as to form an annular passage therein. The body may be movable lengthwise of the secondary chamber.

The degree of overlap as between the main and secondary vortex chambers may be varied as a means of effecting a variation in the classification and/or grading cut mechanism.

Conveniently this variation in the degree of overlap between the main and secondary vortex chambers may be effected by the provision of shuttaring disposed at the common boundary of the two chambers, the shuttering being extensible or retractable across the common boundary to vary its dimension and thus the degree of overlap.

The equipment may be orientated vertically or horizontally.

According to a second aspect of the invention, there is provided a method of classifying and/or grading gas/solids, liquid/solids, or liquid/liquid combinations, comprising the steps of introducing a combination as aforesaid into a main vortex chamber wherein vortical flow is induced, shearing off a component of the combination according to size and/or density into a secondary vortex chamber wherein a secondary vortex is generated and driven by the main vortex, entraining the component in the secondary vortex for precipitation in the secondary vortex chamber, and discharging the remaining components of the combination from the main vortex chamber, whereby the combination is classified or graded.

The combination may be introduced tangentially or in a scroll pattern into the main vortex chamber and is caused to follow a vortical path therewithin.

The vortical path may conveniently be of annular form, and the length of the annular vortical path may be variable in order to select the desired size or density of the component.

The vortex in the secondary combustion chamber may be caused to follow an annular path, the length of which may be variable.

In an alternative, a rotating member may be disposed within the secondary vortex chamber and the speed thereof may be varied to provide a control on the size or density grading of the component.

By way of example only five embodiments of equipment for classifying and/or grading gas/solids, liquid/-solids or liquid/liquid combinations and methods of operating same are described below with reference to the accompanying drawings in which.

Figure 5B:
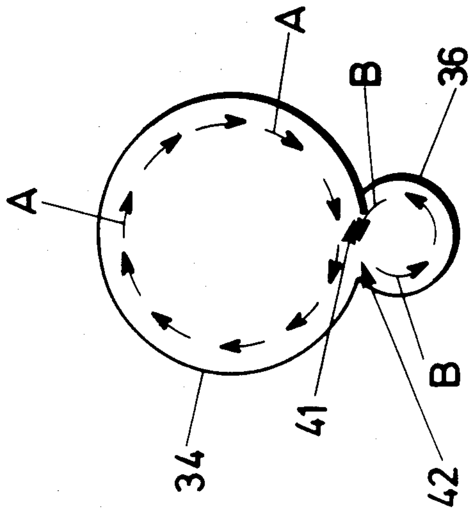
Figure 5A:
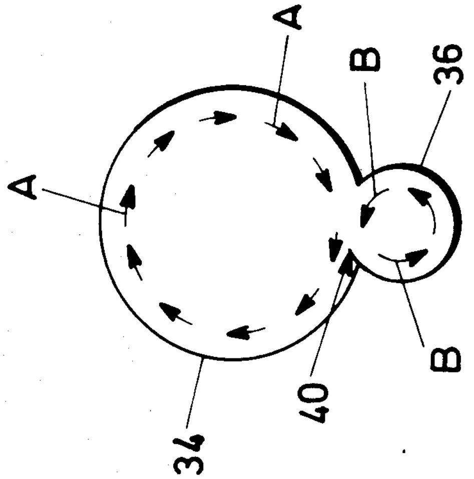

FIG. 5*a* is a diagrammatic sectional end view of a third embodiment;

FIG. 5*b* is a diagrammatic sectional and view of a variation of the embodiment shown in FIG. 5*a*.

Figure 6:
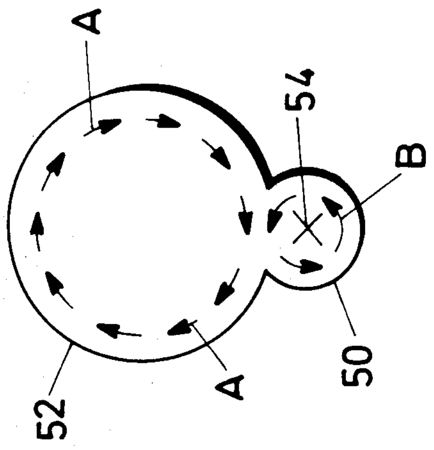

FIG. 6 is a diagrammatic sectional end view of a fourth embodiment; and

Figure 7:
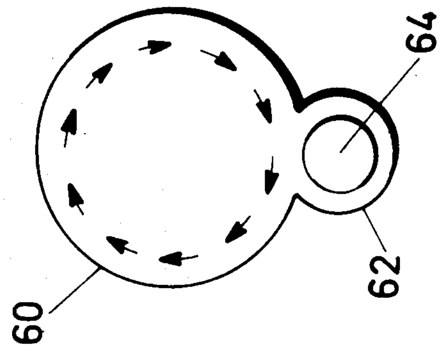

FIG. 7 is a diagrammatic sectional end view of a fifth embodiment.

Figure 2:
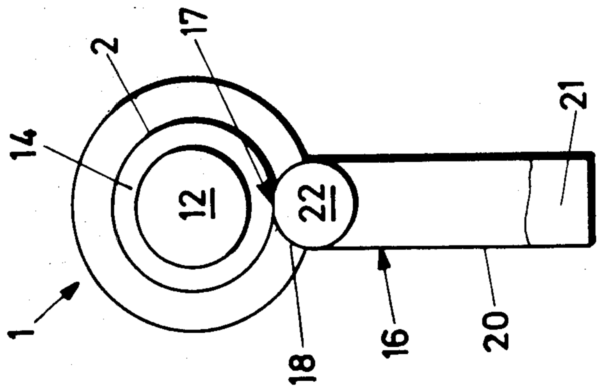
FIG. 2 is a diagrammatic end view of the equipment shown in FIG. 1.
Figure 1:
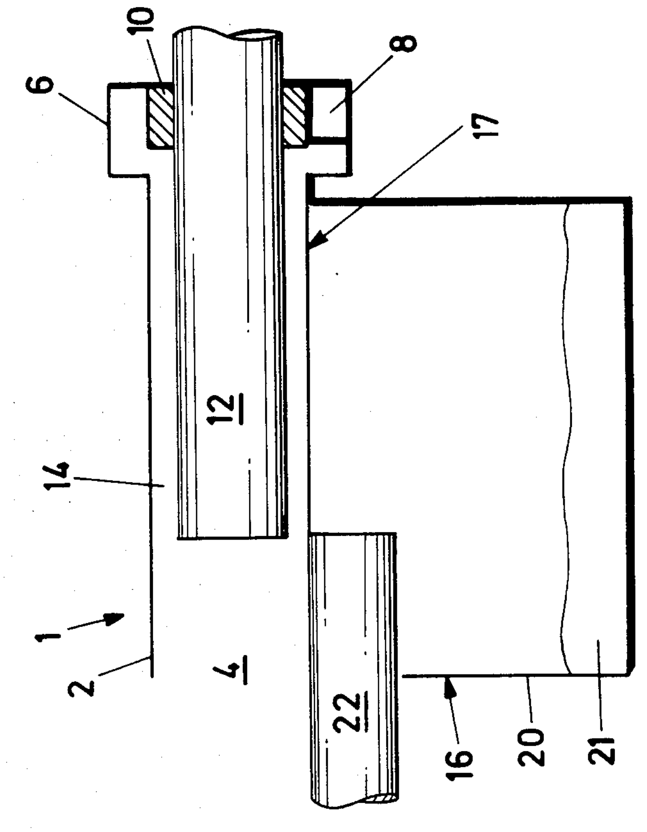
FIG. 1 is a diagrammatic side sectional view of a first embodiment.

Referring to FIGS. 1 and 2, a classifier and/or grader is shown generally at 1 and comprises a hollow cylindrical body 2 defining a horizontally arranged main vortex chamber 4 having an enlarged inlet section 6 with a tangential inlet 8. A vortex weir 10 is provided within section 6 to afford a stabilising effect prior to the main chamber 4. A solid cylindrical rod 12 extends co-axially within the body 2 to define a narrow annular passage 14 and is movable horizontally of the chamber 4.

A secondary vortex chamber 16 intersects and opens into the main chamber 4 at 17, the chamber 16 being of curvilinear form with a curved section 18 adjacent the chamber 4 leading to a linear section 20 therebeneath. A solid cylindrical rod 22 is disposed within the chamber 16 adjacent the boundary between the two chambers and is movable lengthwise of the chamber 16, the rod 22 being suitably profiled as shown to match the main vortex chamber wall.

In operation of the first embodiment, a gas/solids combination, for example coal particles entrained in air, is introduced through the inlet 8; the flow of the combination is stabilised in the section 6 by virtue of the weir 10. Vortical flow is generated within the main vortex chamber 4 and at the same time a secondary vortex is generated in the secondary chamber 16 and is driven by the main vortex. The main vortical flow extends through the annular passage 14, the length of which is determined by the position of the rod 12. The position of the rod 12 is selected to give a desired 'cut' or size fraction component to be removed by the secondary vortex, the position of the rod 22 being adjusted such that the length of the secondary vortex chamber adjacent the boundary corresponds with the length of the annular passage 14. The ends of the rods 12 and 22 thus are aligned as shown. As the vortical flow proceeds along the annular path, a size component of particles is sheared off through opening 17 into the secondary vortex chamber and is captivated by the secondary vortex rotating therein. The particles are precipitated as at 21 in the secondary vortex chamber and can be removed therefrom as required. The remaining components of the combination are discharged through an appropriate discharge outlet (not shown).

It will be appreciated that more than one secondary vortex chamber may be provided along the length of the main vortex chamber, the control rods being positioned in such manner as to yield different size fractions or cuts as required.

Figure 4:
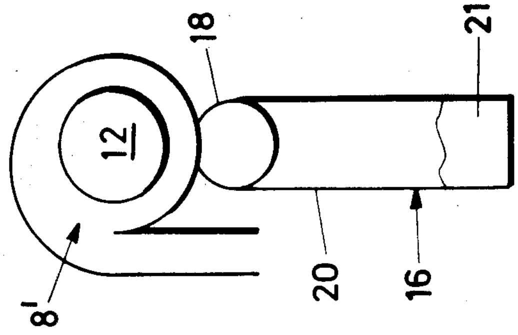
FIG. 4 is a diagrammatic end view of the equipment shown in FIG. 3.
Figure 3:
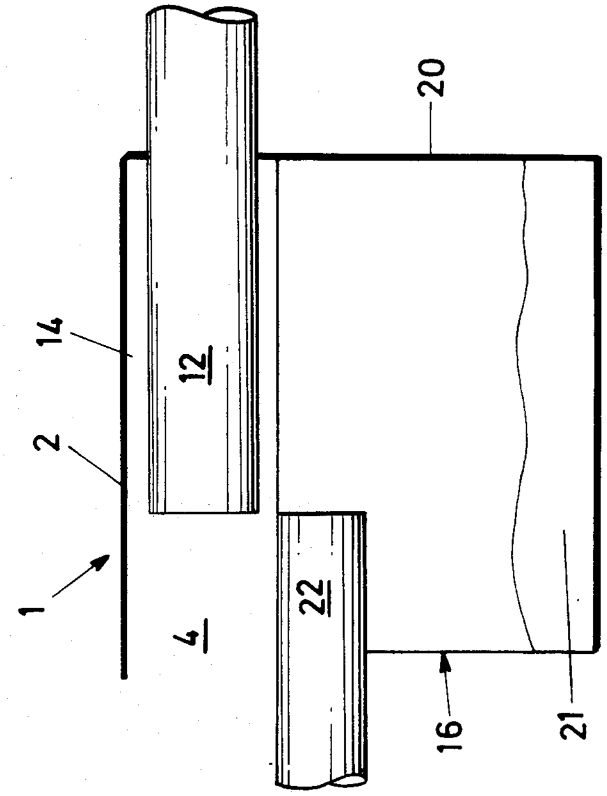
FIG. 3 is a diagrammatic side sectional view of a second embodiment.

Referring now to FIGS. 3 and 4, the main elements of the second embodiment are the same as those of the first embodiment save that a scroll inlet 8' is provided to fire a swirling flow directly into the annular passage 14. The relative positions of the inlet 8' and the boundary between the two chambers may also be varied to afford a control on the size cut of the component passing into the secondary chamber 16.

With reference to FIG. 5*a*, there is shown a third embodiment comprising a main vortex chamber 34 having a tangential inlet (not shown), vortical flow being indicated by arrows A. A secondary vortex chamber 36 intersects and opens into the chamber 34, the vortical flow therein being indicated by arrows B. A forwardly facing wall 38 of the chamber 36 is provided with an extension 40 projecting into the chamber 34. The extension 40 may be adjustable in position to give a variable control on the size fraction sheared off into the chamber 36. The extension 40 ensures that only mainly larger particle fractions are collected in the chamber 36, the finer fractions being deflected by flow disturbance back into the main vortex flow.

Referring to FIG. 5*b*, there is shown a variation of the third embodiment of FIG. 5*a*, the extension 40 being replaced by a shutter 41 which is extensible and retractable across the common open boundary 42 between the main vortex chamber 34 and the secondary vortex chamber 36. Variation of the position of shutter 41 controls the size cut of the material captured in the secondary vortex chamber 36.

FIG. 6 illustrates a fourth embodiment in which a secondary vortex chamber 50 intersects and opens into a main vortex chamber 52, the vortical flows being respectively indicated by arrows B and A. In this embodiment, a bladed rotor 54 is disposed co-axially within the chamber 50. A combination of say gas and solids is introduced into the main chamber 52, a main vortex being generated therein and a secondary vortex being generated in the chamber 50 and being driven by the main vortex. The rotor 54 is caused to rotate either in the same direction as arrows B or in an opposite direction thereto. The speed of rotation can be varied to give differing size fractions or cuts of the particles captured by the secondary vortex. The provision of the rotor 54 and its rotation alter the structure of the secondary vortex and thus alter the classifying and/or grading capability of the secondary chamber. As there is no net gas flow into the secondary chamber and the gas borne particles concentrate near the walls of the chamber, there is no net particle flow onto the rotor and thus little erosion. Particles do not impinge upon the blades of the rotor since there is no net radial flow towards the centre and the particles precipitate to the base of the secondary vortex chamber.

Referring now to FIG. 7, the fifth embodiment employs a main vortex chamber 60 and a secondary vortex chamber 62 intersecting and opening into chamber 60. A rod 64 extends concentrically within the chamber 62 and defines an annular passage 66 therewithin. The rod 64 is movable lengthwise of the chamber 62 in order to vary the cut or size fraction of the component removed. In operation a gas/solids combination, for example, is introduced tangentially, into the main chamber 60 in which a main vortex is generated. At the same time a secondary vortex is generated in chamber 62 and driven by the main vortex. Solids particles are thrown to the periphery of the main chamber 60 and a component size fraction thereof is sheared off into the secondary chamber 62 and entrapped by the secondary vortex flowing in the annular passage 66, the particles precipitating to the base of the chamber 62. No net gas flow occurs across the boundary between the chambers 60, 62.

Whilst the rod 64 is of right cylindrical form, it may, in an alternative embodiment (not shown), be of tapering form.

The present invention also includes an embodiment (not shown) wherein the degree of overlap between the main and secondary vortex chambers, i.e. the extent to which the chambers intersect, can be varied, for example from 2% to 10%, in order to vary the size fraction or cut of the component removed from the combination passing through the main vortex chamber. At the lower percentage overlap, only coarser fractions will be caught.

It is to be understood that whilst the operation of the embodiments has been described in relation to gas/solids combination, other combinations such as are referred to herein may equally well be classified and/or graded by the equipment and method of the present invention.

we claim:

1. Equipment for the classification and/or grading of gas/solids, liquid/solids or liquid/liquid combinations, comprises a main vortex chamber having an annular passage means formed by a cylindrical body extending into said main vortex chamber and inlet means for the combination and a discharge outlet means, and a secondary vortex chamber intersecting and opening into said annular passage means of the main vortex chamber, the chambers overlapping thereby, said secondary vortex chamber provided with a cylindrical body adjacent the boundary between the main and secondary vortex chambers, means to variably control the degree of overlap, whereby in use a secondary vortex is generated in the secondary vortex chamber and driven by a main vortex in the main vortex chamber, a component of the combination being captured by the secondary vortex and being deposited in the secondary chamber, and the combination thereby being classified or graded.

2. Equipment according to claim 1 in which the secondary vortex chamber is closed whereby in use no net flow occurs across the boundary between the main and secondary vortex chamber.

3. Equipment according to claim 1 in which means are provided for removing the component deposited in the secondary vortex chamber.

4. Equipment according to claim 1 in which the inlet means to the main vortex chamber is tangential.

5. Equipment according to claim 1 in which the inlet means to the main vortex chamber in of scroll form.

6. Equipment according to claim 1 in which the cylindrical body is movable lengthwise of the main vortex chamber.

7. Equipment according to claim 1 in which the body in the secondary vortex chamber is movable lengthwise thereof.

8. Equipment according to claim 1 in which the secondary vortex chamber is provided with an extension protruding into the main vortex chamber.

9. Equipment according to claim 8 in which the extension is movable to assume different degrees of protrusion into the main vortex chamber.

10. Equipment according to claim 1 in which a rotatable member is mounted in the secondary vortex chamber.

11. Equipment according to claim 10 in which the rotatable member is provided with blading.

12. Equipment according to claim 10 in which the rotatable member is adapted to be rotated at different speeds in order to vary the classification or grading cut as required.

13. Equipment according to claim 10 in which the rotatable member is adapted to rotate in the same direction as that of the secondary vortex.

14. Equipment according to claim 10 in which the rotatable member is adapted to rotate in the opposite direction to that of the secondary vortex.

15. Equipment according to claim 1 in which a shutter is provided at the common boundary between the main and secondary vortex chamber and is extensible and retractable thereacross to vary the degree of overlap.

16. A method of classifying and/or grading gas/solids, liquid/solids or liquid/liquid combinations comprising the steps of introducing a combination as aforesaid into a main vortex chamber wherein annular vortical flow is induced, varying the length of the annular vortical path so as to effect shearing off a component of the combination according to size and/or density into a secondary vortex chamber wherein a secondary vortex is generated and driven by the main vortex, entraining the component in the secondary vortex for precipitation in the secondary vortex chamber, and discharging the remaining components of the combination from the main vortex chamber, whereby the combination is classified or graded.

17. A method according to claim 16 in which the combination is introduced tangentially into the main vortex chamber and is caused to follow a vortical path, therewithin.

18. A method according to claim 16 in which the combination is introduced in a scroll pattern into the main vortex chamber and is caused to follow a vortical path therewithin.

* * * * *